Patented Jan. 6, 1948

UNITED STATES PATENT OFFICE 2,434,134

COOLING MEANS FOR INTERNAL-COMBUSTION TURBINE WHEELS OF JET PROPULSION ENGINES

Frank Whittle, Rugby, England, assignor to Power Jets (Research and Development) Limited, London, England Application November 24, 1942, Serial No. 466,805
In Great Britain December 19, 1939

Section 1, Public Law 690, August 8, 1946
Patent expires December 19, 1959

8 Claims. (Cl. 60—35.6)

This invention relates to internal combustion turbines or gas turbines, particularly of the previously proposed form which broadly speaking comprises an air compressor, fuel burning means in the compressor output, and a gas turbine driven by the combustion products, which turbine drives the compressor. Such an arrangement has been proposed for use as a prime mover or power unit for reaction propulsion, and the present invention is especially intended to be applied in that connection, although its use is not confined thereto.

The object of the invention is the cooling of the turbine. Various proposals already exist for the cooling of gas turbines, by a flow of air induced by centrifuging vanes on the turbine wheel itself; but I am not aware of any such proposal which seems both practically and theoretically sound, at least where high turbine speeds are involved and where for reasons which will be later specified it is undesirable that the cooling air should have a large amount of whirl left in it. Moreover, I am unacquainted with any such prior proposal which is well adapted for use in a jet reaction propulsion system, in which ideally the leaving gases, that is the mixture of air and exhaust gases leaving the turbine, have no whirl but only axial momentum.

The present invention is intended to provide for air cooling of the turbine without leaving undesired whirl in the leaving cooling air, and with convenient and efficient air ducting.

Accordingly, the invention consists broadly in the provision of auxiliary blades rigid with the turbine wheel such as to cause a radially outward flow of air over the surface of the wheel, on one or both sides of the wheel, and complementary fixed vanes mounted on the turbine casing walls to receive the air impelled by the blades and convert its whirl velocity into radial velocity. The blade and vane system is preferably employed in conjunction with passages for cooling air which are circumferentially continuous, and means are preferably provided, on the upstream or inlet side of the turbine, at least to collect the cooling air after its contact with the wheel, and exhaust it otherwise than along with the inlet gases of the turbine. On the other (exhaust) side of the wheel, the cooling air is preferably allowed to mingle with the exhaust gases. The invention consists also in constructional features which will be better understood from the following description of a preferred form of the invention with the aid of the accompanying diagrammatic drawing.

Figure 1:
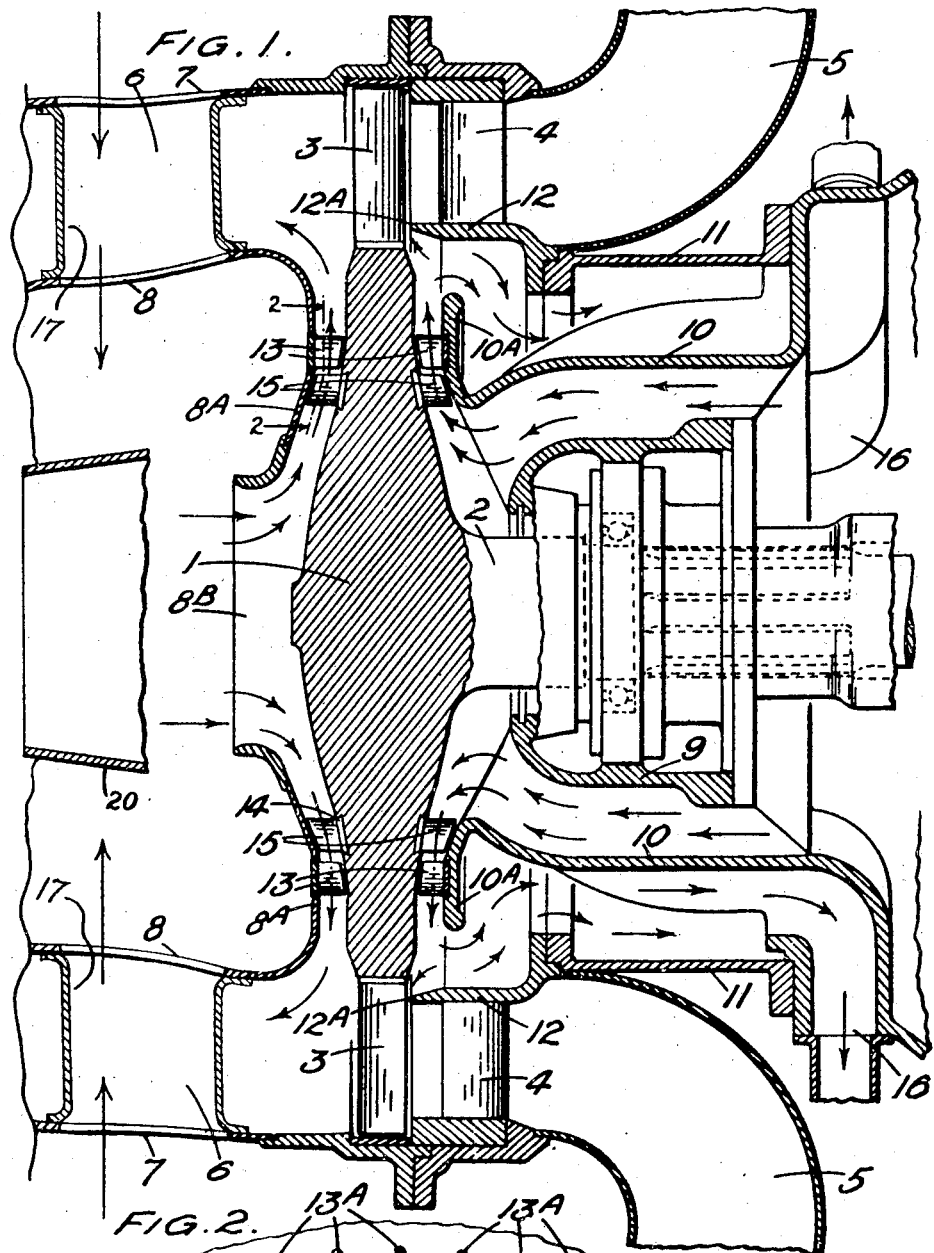

In this drawing, Figure 1 illustrates a gas turbine to which the invention is applied, in section through the axis.

Figure 2:
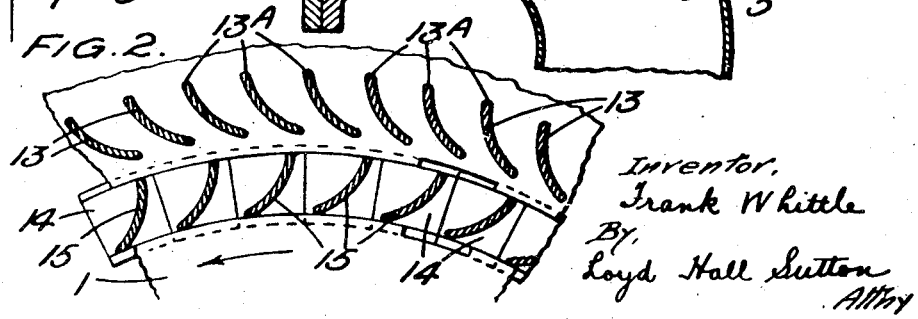

Figure 2 is a scrap view illustrating the arrangement of blades and vanes in section, for example on the line 2—2 of Figure 1.

The turbine is a single-row axial flow overhung turbine with a wheel 1 supported by a shaft 2 by which the shaft-power of the turbine is transmitted. The turbine has blades 3, against which the driving gases impinge from a row of nozzle blades 4, the nozzle ring being supplied by ducting typified by the elbow ducts 5. On the exhaust side, the gases flow from the turbine through an annular passage at 6. This passage 6 is formed by an outer somewhat conical exhaust pipe 7 and an inner correspondingly tapered hollow fairing 8. A bearing for the shaft 2 is carried in a bearing housing 9 which is supported by radial webs within an air ducting arrangement consisting of an inner annular wall 10 and an outer annular wall 11. The outer wall 11 carries, at 12, the inner boundary wall of the nozzle ring assembly in which the nozzle blades 4 are included. The inner air duct wall 10 has a radial portion 10A, which forms, in effect a wall of the turbine casing. On the downstream or exhaust side of the wheel 1, the fairing 8 has an inwardly extending wall part 8A which also forms, in effect, a wall of the turbine casing. The walls 8A, 10A, each support a ring of fixed vanes 13 (see also Figure 2) of arcuate section and disposed so that at their leaving edges 13A, their direction is radial or nearly so. The angle of their entering edges depends on the design speed, radius, etc.

The wheel 1 has undercut grooves cut coaxially in its faces on both sides; these grooves receive and retain plates 14 each of which carries an air impeller blade 15. The blades 15 to which the vanes 13 are complementary and closely adjacent, are similarly shaped but oppositely handed, so that they (blades 15) impel air radially and inevitably whirl it and the vanes 13 receive this air and remove the whirl, leaving only radial velocity.

The plates 14 are inserted in their grooves through a slot, each plate after insertion being slid around until the groove is full, when the last plate having been inserted either it is secured in the slot or the whole ring of plates is slid round so that none registers with the slot, after which all are locked. The vanes 13 and the blades 15 extend practically across the space between the surfaces of the wheel 1 and the casing walls 8A and 10A, leaving only such tip clearance as is desirable.

The air on the exhaust side of the wheel 1 is sucked through the fairing 8, for example through tubular struts 17, through the axial hole 8B bounded by the wall 8A, and thence flows outwards "washing" the face of the wheel 1, passing through the blade and vane system, and joining the exhaust gases downstream of the turbine blades 3. The air on the inlet side of the turbine enters by passing between the housing 9 and wall 10, "washes" the exposed surface of the wheel 1, flows outwards through the blade and vane system, and for the most part is received in the space between the walls 10 and 11 whence it escapes by ducts 16 and forms a supply of warmed air under pressure, usable as may be convenient.

The edge of the wall 12 at 12A must of course be clear of the blades 3. There is then the possibility of working gas escaping through the clearance and flowing inwardly along the surface of the wheel. Therefore it is preferably arranged that in ordinary working conditions the air pressure in the space between the walls 10, 11 is sufficiently high to prevent such leakage and to ensure that there is some flow of air outwards through the clearance at 12A. This may have the advantage also of cooling the roots of the blades 3, which is desirable in some cases.

The removal of whirl velocity by the blades 13 has three main effects. In the first place the radial velocity of the air is increased, i. e., the air leaving the blades 13 has a greater velocity relative to the turbine wheel face than the air entering the said blades. This results in a greater cooling effect of the air on the turbine wheel face.

Finally the removal of whirl ensures that the cooling air on the outlet side of the turbine 1 flowing along the annular passage 6 travels substantially parallel with the exhaust gases leaving the turbine, whereby no eddies are set up in said annular passage and in the case of a reaction propulsion system more efficient reaction propulsion is thereby obtained.

In a modification, the blades and vanes on the exhaust side of the turbine may be omitted and the air passages corresponding either left open for such induced flow as may occur, or be closed. As is usual in jet propulsion engines, the hollow tapered fairing 8 tapers rearwardly to a pointed end and the conical exhaust pipe 7 also tapers rearwardly so that it eventually forms an exhaust jet 20 from which gas is exhausted to propel the aircraft.

What I claim is:

1. In a gas turbine, adapted to be operated by a hot gas stream and comprising a wheel, turbine blades disposed peripherally on said wheel in the path of the gas stream, and a reaction nozzle through which the gas stream after leaving the turbine is ejected to yield propulsive thrust, the improvement that consists of cooling means comprising a plurality of auxiliary radial blades rigid with said wheel and adapted to entrain a flow of cooling air and to drive said air outward over the surfaces of said wheel and into the gas stream, means for conducting cooling air to said auxiliary blades, and means for removing whirl from said cooling air, comprising a plurality of fixed vanes disposed in spacial relation to and cooperating with said auxiliary blades for converting the whirl velocity of said air into radial velocity, thus increasing the speed of radial flow, and the pressure, of the cooling air and preventing the formation of eddy currents in said gas stream, thus preventing losses in efficiency due to pressure losses that would otherwise be caused by said eddy currents.

2. A device as defined in claim 1, further characterized in that the auxiliary blades are arranged in a circular series.

3. A device as defined in claim 1, further characterized in that the auxiliary blades are arranged in a circular series and extend axially of said turbine blades in a region spaced radially from the blade supporting rim.

4. A device as defined in claim 3, further characterized in that the wheel of the gas turbine is provided with a single peripheral row of blades for axial flow operation.

5. A device as defined in claim 1, having an annular axially directed air passage coaxial with the turbine for leading air to the turbine wheel surface at less radii than that at which said peripheral blades are situated, a turbine bearing housing located at least in part within said passage, and a second annular air passage surrounding the first passage to lead the air from the turbine wheel surface.

6. A device as defined in claim 1, having an annular axially directed air passage coaxial with the turbine for leading air to the turbine wheel surface at less radii than that at which said peripheral blades are situated, and a second annular air passage surrounding the first passage to lead the air from the turbine wheel surface.

7. A device as defined in claim 1, having an annular axially directed air passage for leading said air from the turbine wheel surface, the outer wall of said passage being spaced from the peripheral blades to provide an inlet passage to said peripheral blades, the pressure of the cooling air in said annular passage substantially preventing flow of the driving gas thereinto from said inlet passage.

8. A device as defined in claim 1, having an annular exhaust passage for said peripheral blades, the inner wall of said passage having openings whereby said air enters said passage and joins the exhaust from the turbine.

FRANK WHITTLE.

REFERENCES CITED

The following references are of record in the file of this patent:

UNITED STATES PATENTS

| Number | Name | Date |
|---|---|---|
| 1,319,752 | Brown | Oct. 28, 1919 |
| 1,868,143 | Heinze | July 19, 1932 |
| 1,959,703 | Birmann | May 22, 1934 |
| 2,180,168 | Puffer | Nov. 14, 1939 |
| 2,364,189 | Büchi | Dec. 5, 1944 |

FOREIGN PATENTS

| Number | Country | Date |
|---|---|---|
| 375,643 | Great Britain | June 30, 1932 |
| 346,599 | Germany | Jan. 5, 1922 |
| 593,093 | Germany | Feb. 21, 1934 |